Patented Jan. 19, 1937

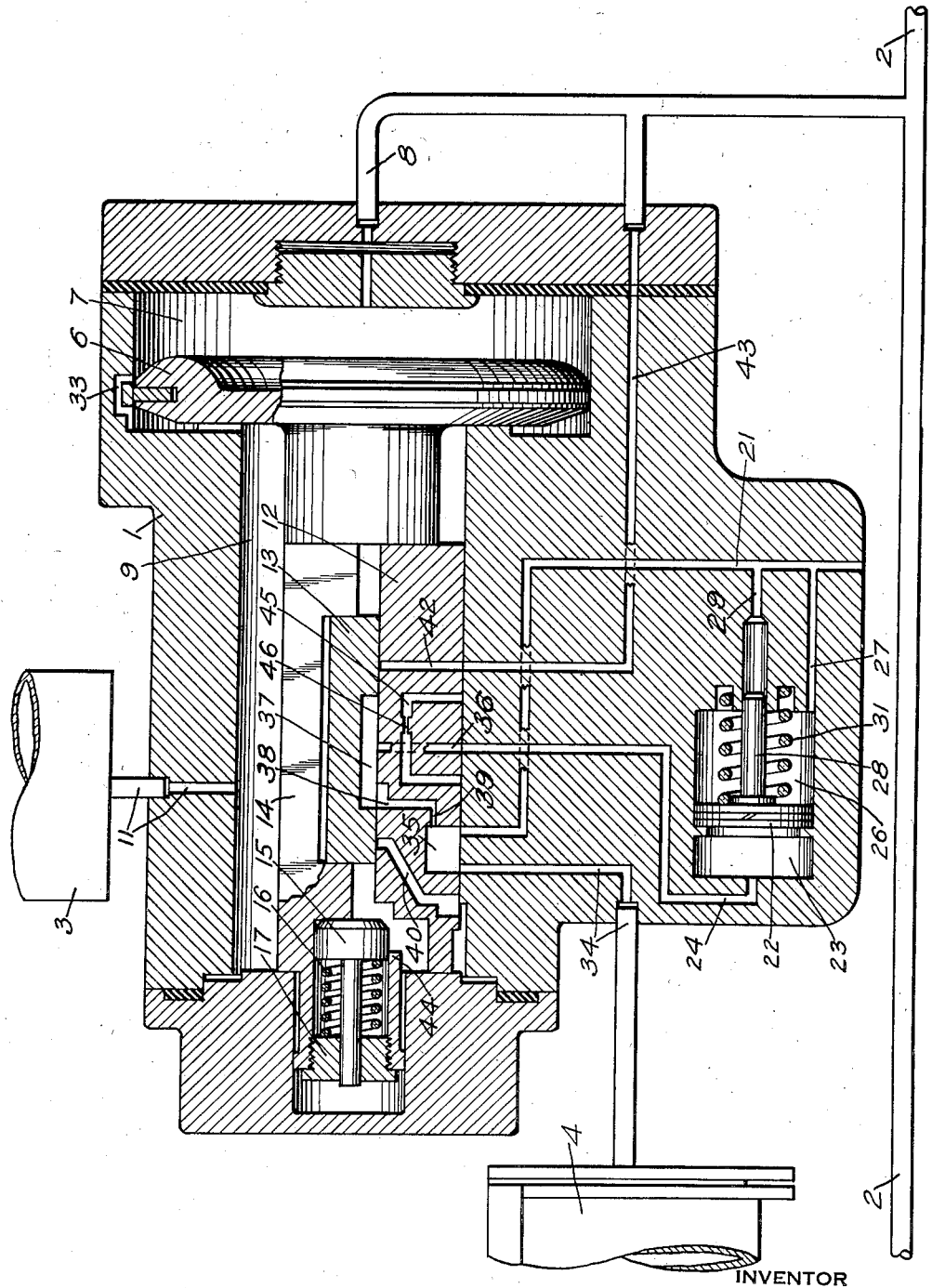

2,068,343

UNITED STATES PATENT OFFICE 2,068,343

QUICK SERVICE DEVICE

Joseph C. McCune, Edgewood, Pa., assignor to The Westinghouse Air Brake Company, Wilmerding, Pa., a corporation of Pennsylvania Application November 9, 1935, Serial No. 48,953

10 Claims. (Cl. 303—39)

This invention relates to fluid pressure brakes, and more particularly to an automatic fluid pressure brake system in which the brakes are applied by reducing the brake pipe pressure and are released by increasing the brake pipe pressure.

It has heretofore been proposed to provide quick service means on each car of a train equipped with a fluid pressure brake system of the above type, operative to effect a limited local venting of fluid under pressure from the brake pipe to a bulb, in order to accelerate propagation of the brake pipe pressure reduction wave throughout the train and thereby produce prompt serial action of the triple valves.

The principal object of my invention is to provide an improved quick service means by operation of which the local quick service venting of fluid under pressure from the brake pipe, which may be at a fast rate, is so controlled as to avoid causing a brake pipe reduction at a rate dangerously approaching an emergency rate.

Another object of the invention is to provide an improved form of quick service means on each car of a train operative upon a reduction in brake pipe pressure to vent fluid under pressure from the brake pipe initially at a fast rate, and then operative gradually to diminish the local venting of fluid, thus minimizing the possibility of surging of fluid in the brake pipe such as might effect an undesired release of the brakes.

In the accompanying drawing, the single figure is a diagrammatic view, mainly in section, of a fluid pressure brake equipment embodying my invention.

The equipment includes a triple valve device 1, a brake pipe 2, an auxiliary reservoir 3 and a brake cylinder 4. The triple valve device 1 comprises a casing containing a triple valve piston 6, which has on one side a chamber 7 connected through a branch pipe 8 to the brake pipe 2, and on the opposite side a valve chamber 9 connected through a passage and pipe 11 to the auxiliary reservoir 3. Contained in the valve chamber are a slide valve 12 and a graduating valve 13, which are adapted to be operated by the piston 6 through the medium of a stem 14. A yielding stabilizing device is provided on the end of the stem 14 for preventing undesired movement of the slide valve upon slight fluctuations in brake pipe pressure, said device comprising a plunger 15 adapted to engage one end of the slide valve 12, and a spring 16 disposed between said plunger and a nut 17 secured to the stem.

According to my invention, a quick service controlling piston 22 is slidably mounted in a suitable bore in the casing 1, forming on one side a quick service chamber 23 to which is connected a passage 24 leading to the seat of the slide valve 12, said piston having on the opposite side a spring chamber 26 open to the atmosphere through a passage 27 and an atmospheric exhaust passage 21. The quick service piston 22 has a stem 28 extending through the spring chamber 26 and having one end mounted to slide in a suitable bore, said bore communicating through a passage 29 and the passage 21 with the atmosphere for preventing entrapment of fluid under pressure behind said stem. A spring 31 is interposed between the quick service piston 22 and a countersunk portion of the end wall of the spring chamber 26 and normally retains the piston in a position such that said piston defines a sufficient initial or empty volume in the quick service chamber 23 to permit a local quick service reduction in brake pipe pressure at a fast rate in effecting a service application of the brakes, while limiting the amount of fluid under pressure discharged from the brake pipe at the fast rate so as to avoid effecting an emergency reduction in brake pipe pressure.

In initially charging the equipment, fluid under pressure supplied to the brake pipe 2 in the usual manner flows through the pipe 8 to the chamber 7 in the triple valve device 1, and thence flows through a charging feed duct 33 to the valve chamber 9, and through the passage and pipe 11 to the auxiliary reservoir 3. With the triple valve device in the release position, as shown in the drawing, the brake cylinder 4 is connected to the atmosphere through a pipe and passage 34, a cavity 35 in the main slide valve 12 and the passage 21. In this position, the quick service chamber 23 is also connected to the atmosphere by way of the passage 24, a port 36 in the main slide valve 12, a cavity 37 in the graduating slide valve 13, and a port 38 in said main slide valve open through a restricted portion 39 to the cavity 35 and atmospheric exhaust passage 21.

If it is desired to effect a service application of the brakes, the pressure of fluid in the brake pipe 2 is reduced at a service rate in the usual manner, and upon the consequent reduction in the fluid pressure in the chamber 7 of the triple valve device, the fluid pressure in the valve chamber 9 moves the piston 6 to the right. Through the medium of the stem 14, the piston 6 moves the graduating slide valve 13 relatively to the main slide valve 12, bringing the plunger 15 of the stabilizing device into engagement with the main slide valve and causing the spring 16 to yield when the differential pressure in the auxiliary reservoir side of said piston exceeds the reduced brake pipe pressure sufficiently to overcome said spring. In so moving, the graduating slide valve uncovers a service port 40 in the main slide valve, laps the port 38, and then causes the cavity 37 to register with a port 42 in said main slide valve, which port is connected to a passage 43 in the triple valve casing leading to the branch pipe 8, said main slide valve being in its initial position. Fluid under pressure is thereby permitted to flow from the brake pipe 2 through the branch pipe 8, passage 43, port 42, cavity 37, port 36 and passage 24 to the quick service chamber 23, thus effecting a quick local reduction in brake pipe pressure.

Since the normal volume of the quick service chamber 23 may be relatively small, in order that the initial quick service flow of brake pipe fluid to said chamber at a fast rate will be so limited in amount as to avoid an undesired emergency reduction in brake pipe pressure, the fluid pressure in said quick service chamber is apt to be rapidly built up by fluid supplied from the brake pipe. When the fluid pressure acting on the piston 22 slightly exceeds the opposing pressure of the spring 31, said piston will begin moving to the right against said spring, which is adapted to yield under a fluid pressure in said quick service chamber of a predetermined degree less than that at which the brake pipe pressure equalizes into said chamber.

The increasing fluid pressure in the quick service chamber 23 forms a back pressure tending to retard the rate of further quick service flow of fluid under pressure from the brake pipe to said chamber, while the gradual displacement of the quick service control piston 22 in accordance with the degree of fluid pressure built up is adapted to increase the volume of said chamber, thus permitting the quick service flow to continue. It will be seen that, by reason of the prolonged quick service flow of fluid under pressure at a diminishing rate, any tendency of the rapidly increasing fluid pressure in the quick service chamber 23 to approach abrupt equalization with that in the brake pipe and sudden checking of the quick service flow, is avoided.

The above described local venting of fluid under pressure from the brake pipe ensures further movement of the triple valve device to service position, and, repeated serially at each triple valve device in the train, causes rapid propagation of the pressure reduction wave throughout the train. As the triple valve piston 6 continues movement to the right, a shoulder 44 on the end of the stem 14 is brought into engagement with the main slide valve 12, thereby shifting said valve in the same direction. In thus moving from the quick service position, the main slide valve laps the quick service ports 36 and 42, cuts off the communication from the brake cylinder passage 34 to atmosphere, and finally, in service position, connects said brake cylinder passage with the service port 40. Fluid under pressure is then permitted to flow from the auxiliary reservoir 3 through the pipe and passage 11, valve chamber 9, service port 40 and passage and pipe 34 to the brake cylinder 4, effecting a service application of the brakes.

At the same time, with the main slide valve 12 in the full service position, a port 45 having a restricted portion 46 in said main slide valve registers with the quick service passage 24 and brake pipe passage 43, thereby permitting continued quick service flow of fluid under pressure from the brake pipe by way of the pipe 8, passage 43, port 45 and passage 24 to the quick service chamber 23.

The quick service venting of fluid under pressure from the brake pipe is thus continued at a progressively declining rate, due to the increasing resistance of the compressed spring 31 and the fluid pressure in the quick service chamber 23, in order to overcome any tendency of the initial quick service reduction wave to fade out before reaching the last car of the train, and also to dampen any surging of brake pipe pressure that might be set up upon final termination of flow when the fluid pressures in said quick service chamber and the brake pipe are equalized.

To release the brakes, the brake pipe pressure is increased in the usual manner and the increased brake pipe pressure flows from the brake pipe through the pipe 8 to the chamber 7 in the triple valve device. The increased fluid pressure acting in the chamber 7 operates the piston 6 so as to move said piston and the slide valves 12 and 13 to the release position. With the main slide valve 12 in release position, fluid under pressure is vented from the brake cylinder 4 by way of the pipe and passage 34, cavity 35 and atmospheric exhaust port 21. At the same time, the quick service chamber 23 is also connected to the atmosphere by way of the passage 24, port 36, cavity 37, port 38, restricted portion 39, and the cavity 35 and connected atmospheric passage 21, the function of said restricted portion 39 being to delay the venting of the quick service chamber 23 so as to avoid the possibility of an undesired reduction in brake pipe pressure in case of return of the triple valve device to quick service position due to fluctuations in brake pipe pressure.

From the foregoing description it will be seen that my invention provides improved quick service means for each car of a train, operative upon a service reduction in brake pipe pressure from the brake pipe first to permit a local quick service venting of fluid under pressure from the brake pipe at a fast rate, and then operative to prolong further quick service flow at a gradually diminishing rate.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a brake pipe, a brake controlling valve device operated upon a reduction in brake pipe pressure for effecting an application of the brakes and for venting fluid under pressure from the brake pipe to a chamber, and means operated according to the degree of pressure of fluid built up in said chamber for increasing the volume of said chamber and maintaining said increased volume so long as fluid pressure is maintained in said chamber.

2. In a fluid pressure brake, in combination, a brake pipe, a quick service chamber, a brake controlling valve device operated upon a reduction in brake pipe pressure to vent fluid under pressure locally from the brake pipe to said chamber and for effecting an application of the brakes, and means operative by fluid thus vented to the quick service chamber for increasing and maintaining increased the volume of said chamber.

3. In a fluid pressure brake, in combination, a brake pipe, a brake controlling valve device operated upon a reduction in brake pipe pressure for effecting an application of the brakes, quick service means including a quick service chamber and operative upon a reduction in brake pipe pressure to vent fluid under pressure locally from said brake pipe to said quick service chamber, biasing means, and a movable abutment exposed on one side to the atmosphere and subject to the opposing pressures of said biasing means and of fluid vented to said quick service chamber for increasing the volume of said chamber.

4. In a fluid pressure brake, in combination, a brake pipe, a triple valve device having a quick service chamber, valve means included in said triple valve device operative upon a service reduction in brake pipe pressure for venting fluid under pressure locally from the brake pipe to the quick service chamber, and means interposed between said chamber and the atmosphere and adapted to yield under the pressure of said fluid supplied from the brake pipe for gradually increasing the volume of said chamber.

5. In a fluid pressure brake, in combination, a brake pipe, a triple valve device having a quick service chamber, valve means included in said triple valve device operative upon a service reduction in brake pipe pressure for venting fluid under pressure locally from the brake pipe to the quick service chamber, a spring, and a movable abutment forming one wall of said chamber and subject to the opposing pressures of said spring and the fluid under pressure vented from the brake pipe, said abutment being moved by the increase in pressure of fluid vented from the brake pipe to increase the volume of the chamber, the increased pressure in said chamber preventing the return movement of said abutment.

6. In a fluid pressure brake, in combination, a brake pipe, a triple valve device having a quick service chamber, valve means included in said triple valve device operative upon a service reduction in brake pipe pressure for venting fluid under pressure locally from the brake pipe to the quick service chamber, and resilient means controlling the quick service chamber so as normally to establish a limited atmospheric volume for permitting an initial quick service flow of fluid under pressure from the brake pipe to said chamber at a fast rate, and yieldable in response to a predetermined fluid pressure in said chamber for permitting continued quick service flow at a gradually decreasing rate.

7. In a fluid pressure brake, in combination, a brake pipe, a quick service chamber, a brake controlling valve device operated upon a reduction in brake pipe pressure to vent fluid under pressure from the brake pipe to the quick service chamber and to effect an application of the brakes, and operative upon an increase in brake pipe pressure to establish communication from said quick service chamber to the atmosphere and to effect a release of the brakes, and means subject to fluid pressure in said quick service chamber and a substantially constant opposing pressure and operative by the increase in pressure of fluid vented from the brake pipe to vary the volume of said chamber, the increased pressure in said chamber preventing the return movement of said means.

8. In a fluid pressure brake, in combination, a brake pipe, a quick service chamber, a brake controlling valve device operated upon a reduction in brake pipe pressure to vent fluid under pressure from the brake pipe to the quick service chamber and to effect an application of the brakes, and operative upon an increase in brake pipe pressure to establish communication from said quick service chamber to the atmosphere and to effect a release of the brakes, and means for automatically varying the volume of said chamber comprising a movable abutment forming a movable wall for said chamber and constantly subject on the opposite side to atmospheric pressure, and a spring for opposing movement of said abutment by the fluid pressure vented to said chamber.

9. In a fluid pressure brake, the combination with a brake pipe, of a triple valve device comprising a piston subject to variations in brake pipe pressure, valve means operable by said piston, and a quick service chamber having a predetermined normal volume, said valve means being movable by said piston upon a reduction in brake pipe pressure first to a quick service position for venting fluid under pressure at a fast rate from the brake pipe to the quick service chamber, and then movable by said piston to service position for venting fluid under pressure at a slower rate from the brake pipe to said chamber, and means operated according to the degree of pressure of fluid built up in said chamber for increasing the volume of said chamber.

10. In a fluid pressure brake apparatus, in combination, a brake pipe, a reduction in pressure in which is adapted to effect an application of the brakes, a quick service chamber, means operative upon a reduction in brake pipe pressure to vent fluid under pressure locally from the brake pipe to the quick service chamber, and fluid pressure operated means associated with said quick service chamber and arranged normally to establish a certain volume for permitting an initial quick service flow of fluid under pressure from the brake pipe to said chamber at a fast rate, and yieldable according to the pressure of fluid vented to said chamber for varying the volume thereof to permit continued quick service flow at a gradually decreasing rate.

JOSEPH C. McCUNE.